(12) United States Patent
Chaney et al.

(10) Patent No.: US 9,930,834 B2
(45) Date of Patent: Apr. 3, 2018

(54) AGRICULTURAL BALER CONTROL SYSTEM

(71) Applicant: Deere & Company, Moline, IL (US)

(72) Inventors: Nathan A. Chaney, Bloomfield, IA (US); Craig E. Wenzel, Chicago, IL (US); Alex D. Foessel, Sherrard, IL (US); Henry D. Anstey, Ottumwa, IA (US); Jeremy M. Erdmann, Floris, IA (US); Rodrigo H. Nomura, Indaiatuba (ES); Anand Gupta, Bettendorf, IA (US)

(73) Assignee: Deere & Company, Moline, IL (US)

( * ) Notice: Subject to any disclaimer, the term of this patent is extended or adjusted under 35 U.S.C. 154(b) by 1 day.

(21) Appl. No.: 15/151,153

(22) Filed: May 10, 2016

(65) Prior Publication Data
US 2017/0118918 A1    May 4, 2017

Related U.S. Application Data

(60) Provisional application No. 62/247,983, filed on Oct. 29, 2015.

(51) Int. Cl.
*A01F 15/07* (2006.01)
*A01F 15/08* (2006.01)
(Continued)

(52) U.S. Cl.
CPC .............. *A01F 15/07* (2013.01); *A01F 15/08* (2013.01); *A01F 15/0883* (2013.01);
(Continued)

(58) Field of Classification Search
CPC ...... A01F 15/07; A01F 15/0883; A01F 15/08; A01F 2012/0808; A01D 89/00; A01B 69/007
See application file for complete search history.

(56) References Cited

U.S. PATENT DOCUMENTS

| 5,961,573 A | 10/1999 | Hale et al. |
| 5,995,895 A | 11/1999 | Watt et al. |
| (Continued) | | |

FOREIGN PATENT DOCUMENTS

| DE | 4322293 A1 | 1/1995 |
| DE | 102004027895 A1 | 1/2006 |
| (Continued) | | |

OTHER PUBLICATIONS

Dr.-Ing. Martinvon Hoyningen-Huene et al., "Tractor-Implement-Automation and its application to a tractor-loader wagon Combination". pp. 171-185 Obtained Aug. 20, 2015.
(Continued)

*Primary Examiner* — Anne M Antonucci
(74) *Attorney, Agent, or Firm* — Christopher J. Volkmann; Kelly, Holt & Christenson, PLLC

(57) ABSTRACT

An agricultural material baling system comprises, in one example, a bale forming component configured to form a bale of agricultural material from a terrain, and a control system configured to determine that the bale is to be released from the baling system onto the terrain, determine that a current location of the baling system has a slope above a threshold, determine a different location, that is spaced apart from the current location, for releasing the bale onto the terrain, and provide an output indicative of the different location. In one example, the control system is configured to receive yield data indicative of a volume of agricultural material in a path of the baler and to control the baling system based on the yield data. In one example, the yield data is obtained from a raking operation that rakes the agricultural material into a windrow.

20 Claims, 14 Drawing Sheets

(51) Int. Cl.
*A01B 69/00* (2006.01)
*A01D 89/00* (2006.01)
(52) U.S. Cl.
CPC ............ *A01B 69/007* (2013.01); *A01D 89/00* (2013.01); *A01F 2015/0808* (2013.01)

(56) References Cited

U.S. PATENT DOCUMENTS

| | | | |
|---|---|---|---|
| 6,389,785 | B1 | 5/2002 | Diekhans et al. |
| 6,525,276 | B1 | 2/2003 | Vellidus et al. |
| 6,546,705 | B2 | 4/2003 | Scarlett et al. |
| 7,400,957 | B2 | 7/2008 | Hofer et al. |
| 2002/0011056 | A1 | 1/2002 | Lely |
| 2006/0086263 | A1* | 4/2006 | Degen ..................... A01F 15/08 100/88 |
| 2007/0175198 | A1 | 8/2007 | Viaud et al. |
| 2007/0221073 | A1 | 9/2007 | Guiet et al. |
| 2009/0202322 | A1 | 8/2009 | Gette et al. |
| 2012/0029732 | A1 | 2/2012 | Meyer |
| 2012/0240546 | A1* | 9/2012 | Kormann ............ A01B 69/006 56/344 |
| 2013/0074709 | A1 | 3/2013 | Thompson et al. |

FOREIGN PATENT DOCUMENTS

| | | |
|---|---|---|
| DE | 102005004508 A1 | 8/2006 |
| DE | 102005047306 A1 | 4/2007 |
| DE | 102009047585 A1 | 6/2011 |
| DE | 102014201203 A1 | 7/2015 |
| EP | 1832156 A1 | 9/2007 |
| EP | 2267567 B1 | 8/2014 |
| WO | 2013096959 A2 | 6/2013 |
| WO | 2014137533 A2 | 9/2014 |

OTHER PUBLICATIONS

S. K. Mathanker et al., "Sensing Miscanthus Swath Volume For Maximizing Baler Throughput Rate". American Society of Agricultural and Biological Engineers vol. 57(2): 355-362 ISSN 2151-0032, Obtained Aug. 20, 2015.

Lutz Hofmann, Halle, "Schwadabtastung Mit Ultraschall" Landtechnik 5-93, 3 pages, Obtained Aug. 20, 2015.

Antti Kunnas, Embedded Control System for Agricultural Machinery implemented in Forage Harvesting, 78 pages, Obtained Aug. 20, 2015.

"New Holland's New IntelliCruise Feed Rate Control System Maximises Baling Productivity and Minimises Costs", New Holland Agriculture, 2 pages, Obtained Aug. 20, 2015.

European Patent Application No. 16195122.3 Partial European Search Report dated Mar. 10, 2017, 7 pages.

European Patent Application No. 16195122.3 Extended European Search Report dated Jul. 7, 2017, 14 pages.

* cited by examiner

AGRICULTURAL BALER CONTROL SYSTEM

CROSS-REFERENCE TO RELATED APPLICATION

The present application is based on and claims the benefit of U.S. provisional patent application Ser. No. 62/247,983, filed Oct. 29, 2015, the content of which is hereby incorporated by reference in its entirety.

FIELD OF THE DESCRIPTION

The present description relates to preparing and baling agricultural material. More specifically, but not by limitation, the present description relates to a system for controlling an agricultural baler.

BACKGROUND

There are a wide variety of different types of baled agricultural material. For instance, such material can include cotton, hay, and plant biomass material, among a wide variety of others. Some examples of baled plant biomass material include corn stalks, sugarcane residue, switchgrass, etc.

Agricultural balers can be configured to form bales with a variety of different form factors (different sizes and shapes). For example, some balers create square or rectangular bales and other balers create cylindrical bales.

Typically, a baler has pickup and conveying mechanisms for collecting the agricultural material from the ground and conveying it into a bale forming chamber, such as a compression chamber. Then, once formed, the bale is released onto the ground for subsequent pickup by another machine. During these operations, the baler may become plugged. Rectifying a plugged baler is time consuming and can be labor-intensive (i.e., the operator is required to stop the baling operation to remove the plugged material which reduces the overall baling rate (hectares/hour)).

Also, depending on the terrain, placement of a released bale can be troublesome. For instance, in the case of cylindrical bales, depositing the bale on a slope can result in the bale rolling down the slope. Not only can retrieval of such a bale be time consuming in requiring the pickup machine to travel further to retrieve the bale, but the rolling bale can result in significant damage to structures or equipment, and/or severe injury to humans or livestock.

The discussion above is merely provided for general background information and is not intended to be used as an aid in determining the scope of the claimed subject matter.

SUMMARY

An agricultural material baling system comprises, in one example, a bale forming component configured to form a bale of agricultural material from a terrain, and a control system configured to determine that the bale is to be released from the baling system onto the terrain, determine that a current location of the baling system has a slope above a threshold, determine a different location, that is spaced apart from the current location, for releasing the bale onto the terrain, and provide an output indicative of the different location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
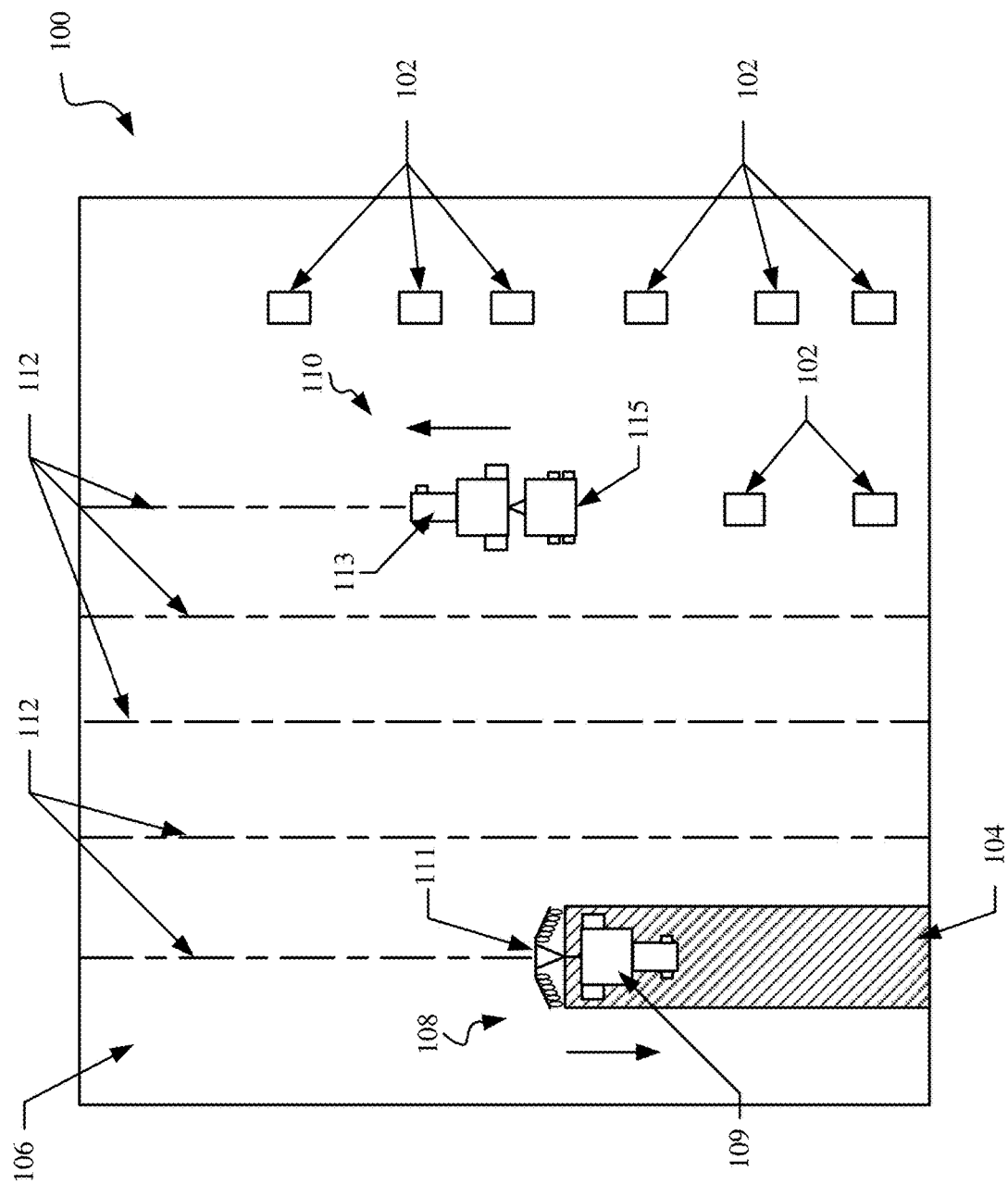
FIG. 1 is a block diagram of one example of an agricultural material processing operation.

FIG. 1 is a block diagram of one example of an agricultural material processing operation 100 that forms bales 102 from agricultural material 104 in a field 106. The agricultural material can be any of a variety of types including, but not limited to, cotton, hay, and plant biomass material, among a wide variety of others.

As illustrated, a preparation operation is performed by an agricultural material preparation machine 108 that prepares the material 104 for baling by a bale forming machine 110. Examples of preparation operations include mowing, cutting, and/or raking the material into a form that is acceptable by bale forming machine 110. In the present example, but not by limitation, machine 108 comprises a raking machine that rakes cut or mowed material into windrows 112.

In one example, each of machines 108 and 110 comprises a single, self-propelled implement or vehicle. For instance, a self-propelled baling forming machine includes both bale forming functionality and a drive motor or other drive mechanism for traversing the machine across the field. Similarly, a self-propelled mower includes both mowing functionality and a drive mechanism, and a self-propelled rake includes both raking functionality and a drive mechanism.

In one example, each of machines 108 and 110 can include a towed implemented that is towed by a towing vehicle. For instance, machine 108 can comprises a raking machine pulled by an agricultural tractor and machine 110 can comprises a baling machine pulled by a same or different agricultural tractor.

Depending on the type of material, the windrows 112 may be left to dry for a period of time (e.g., several days) before being collected and formed into bales 102 by machine 110. In another example in which windrows 112 does not require drying (e.g., sugarcane residue and the like), machine 110 can closely follow machine 108 to bale the material. In other words, the preparation operation and the baling operation can be performed in a same pass through field 106 or in separate passes that occur at or around the same time. In a single pass example, a same towing machine, such as an agricultural tractor, can pull both a rake and a baler. In another example, different towing machines (or a same towing machine in different passes) separately tows the rake and the baler through field 106. As used herein, a "pass" refers to a single instance of a driving or towing machine traversing a path through field 106. As such, multiple, separate passes are made even if the preparation machine 108 and bale forming machine 110 are independently driven through field 106, but are simultaneously operating within a same windrow 112.

In the illustrated example, machine 108 comprises a towing implement 109 (e.g., an agricultural tractor) and a towed implement 111. Implement 111 comprises an agricultural rake which can includes any device that uses a rake or rake-like mechanism to form agricultural material into a windrow or swath. Examples include, but are not limited to, rotary rakes, finger wheel rakes, parallel bar rakes, rake/tedder combination devices, and windrow mergers. One example of a windrow merger comprises a belt merger.

In the illustrated example, machine 110 includes a towing implement 113 (e.g., an agricultural tractor) and a towed implement 115 comprising a baler. In one example, implement 115 can further include a bale accumulator (not shown in FIG. 1) that holds one or more bales after they are formed by and ejected from the baler. A bale accumulator allows the machine to collect and transport one or more bales to a desired location in field 106 before depositing them on the ground.

Figure 2:
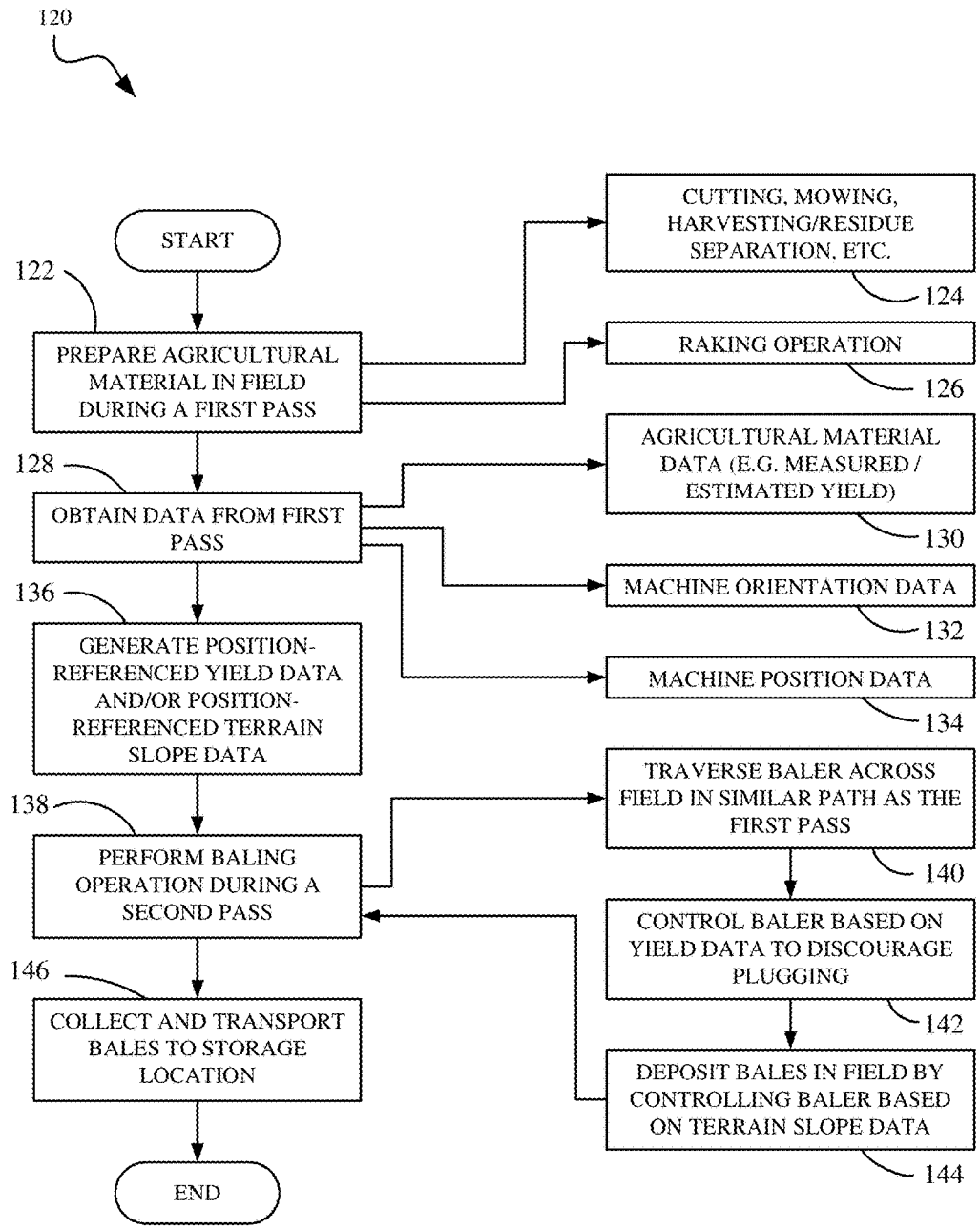
FIG. 2 is a flow diagram of one example of a method for preparing and baling agricultural material.

In accordance with one example, FIG. 2 is a flow diagram of one example of a method 120 for preparing and baling agricultural material. For sake of illustration, but not by limitation, method 120 will be described in the context of operation 100 shown in FIG. 1.

At block 122, the agricultural material 104 is prepared in field 106 during a first pass. For example, this can comprise a cutting or mowing operation (represented by block 124) and/or a raking operation (represented by block 126). In one example, the preparation comprises harvesting with biomass/residue separation.

At block 128, data indicative of the operations in the first pass is obtained. For example, this can include obtaining agricultural material data (represented by block 130), machine orientation data (represented by block 132) and/or obtaining machine position data (represented by block 134). In one example, agricultural material data comprises a measured or estimated yield. As discussed in further detail below, this can include information indicative of a volume of windrows 112.

One example of machine orientation data at block 132 includes pitch, roll, and/or yaw data obtained from corresponding sensor(s) on machine 108. This information is indicative of a slope of the terrain within field 106. The machine position data at block 134 is used to identify the position of machine 108 within field 106. For example, the machine position data at block 134 can be obtained using a global position system (GPS) sensor, a dead reckoning sensor, or a wide variety of other sensors. This, of course, is by way of example only.

At block 136, position-referenced yield data and/or position-referenced terrain slope data is generated using the data obtained at block 128. In this example, the agricultural material data at block 130 and the machine orientation data at block 132 are obtained at a plurality of discrete times (i.e., periodically or after a pre-defined number of feet traversed within field 106). The plurality of discrete data points are correlated to the corresponding position data at block 134. As such, the information at block 136 can be used to generate a terrain slope map that identifies a slope of the terrain in field 106 and/or a yield map that shows the expected volume of windrows 112 at a plurality of points along the windrows.

Position-referencing data can be done in any suitable way. In the illustrated example, data is position-referenced by attaching, tagging, or otherwise associating position information with the data. In one particular example, the data is geo-tagged by assigning a tag or other piece of information to the data. This, of course, is by way of example only. Other ways of geo-locating or referencing the data can be performed.

At block 138, a baling operation is performed. In the present example, this includes traversing the baler across the field during a second pass. Of course, the baling operation at block 138 can be performed during the first pass as well. In either case, the baler is traversed across the field in a similar path as the preparation machine at block 122. This represented at block 140. That is, bale forming machine 110 follows windrows 112 formed by machine 108.

At block 142, the baler is controlled based on the yield data to discourage plugging. One example of this is discussed in further detail below. Briefly, however, at block 142 the baler is controlled to maintain the feed rate or throughput rate in the baler below a threshold to discourage the material from plugging the baler. This can include adjusting the speed of the baler and/or the baler pickup height.

At block 144, the bales are deposited in field 106 by controlling the baler based on terrain slope data. The terrain slope data can comprise the position-referenced terrain slope data generated at block 136, as well as data obtained from other sources. For instance, terrain slope data can be obtained by topographical mapping tools such as an system LIDAR (i.e., a remote sensing technology that measures distance by illuminating a target with a laser and analyzing the reflected light) and a geographic information system (GIS), to name a few. One example of this is discussed in further detail below. Briefly, however, block 144 operates to discourage or prevent bales from being placed on terrain having a slope that is likely to result in cylindrical bales rolling down the slope and/or difficulty in subsequent pickup of the bales (i.e., even in the case of square or rectangular bales it may be difficult for bale pickup equipment to traverse terrain with a large inclination angle).

In one example, block 144 automatically controls bale forming machine 110 to move the bale ejection mechanism of machine 110 to a position and orientation based on the terrain slope data and a slope threshold. The slope threshold can be pre-defined, user-defined, and/or user-adjustable. For instance, the threshold can be based on an acceptable inclination angle (e.g., 20 degrees, 25 degrees, 30 degrees, etc.) below which the bales can be placed on the terrain in any orientation. In another example, the threshold can be based on a combination of the inclination angle of the slope and a difference between the axis of the cylindrical bale when it is deposited on the ground and the direction of the slope. For example, but not by limitation, for slope inclination angles between 25-30 degrees the control requires that the axis of the bale be within 15 degrees of a direction of the slope, and for slope inclination angles between 20-25 degrees the control requires that the axis of the bale be within 20 degrees of the slope. This, of course, is by way of example only.

In another example of block 144, the bale forming machine can be controlled to provide feedback or instructions to the operator based on the terrain slope data. One example of this is discussed in further detail below. Briefly, however, instructions can be provided to the operator as to how machine 110 can be maneuvered to deposit the bale at an acceptable location and orientation in field 106. At block 146, the bales are collected from field 106 and transported to a storage location.

Figure 3:
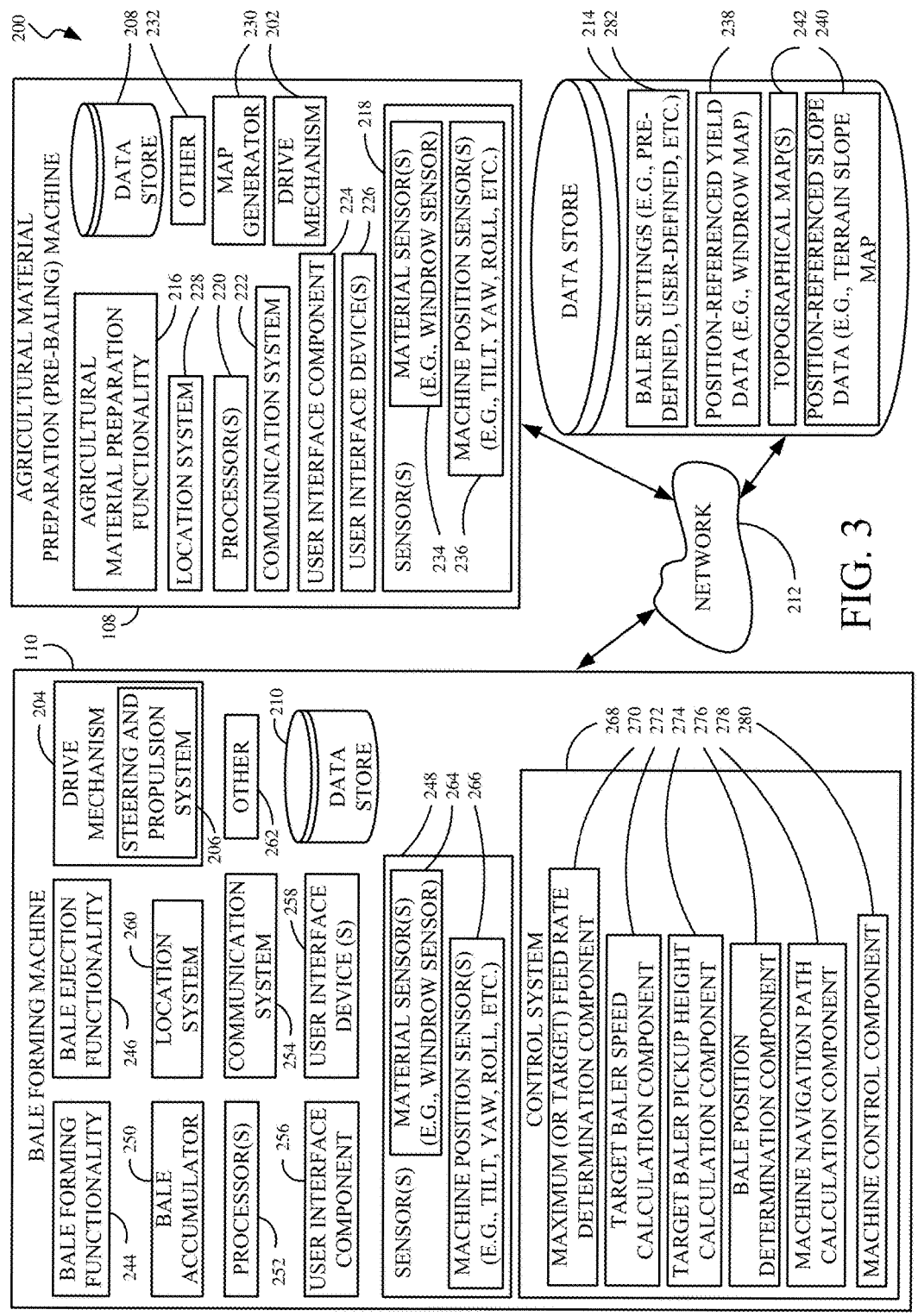
FIG. 3 is a block diagram illustrating one example of an environment in which an agricultural material preparation machine and bale forming machine operate.

FIG. 3 is a block diagram illustrating one example of an environment 200 in which agricultural material preparation machine 108 and bale forming machine 110 operate. FIG. 3 illustrates example components, modules, and/or functionality of machines 108 and 110. For the sake of illustration, but not by limitation, environment 200 will be described in the context of FIG. 1.

As shown in FIG. 3, one or more of machines 108 and 110 include a drive mechanism for moving the respective machines across field 106. That is, as mentioned above, it is noted that machines 108 and 110 can comprise or utilize a same towing implement, or different towing implements, for conveying the machines across field 106. Thus, while FIG. 3 illustrates machines 108 and 110 as having separate drive mechanisms 202 and 204, a same drive mechanism can be used for both machines 108 and 110.

As shown in FIG. 3, drive mechanism 204 can include a steering and propulsion system 206 for controlling a speed of the machine(s) and a direction of travel. In one example, steering and propulsion system 206 is controlled by an operator using steering controls and throttle or other speed controls.

Each of machines 108 and 110 can include a data store. As shown in FIG. 3, machine 108 includes a data store 208 and machine 110 includes a data store 210. Machines 108 and 110 can communicate with one another through a network 212. Machines 108 and 110 can also communicate with a remote data store 214 as well.

Before describing operation of machines 108 and 110 in more detail, one or more examples of each of the items in environment 200 will first be described with respect to FIG. 3. Machine 108 includes agricultural material preparation functionality 216, and one or more agricultural or other sensors 218. Machine 108 can also include one or more processors 220, a communication system 222, a user interface component 224, one or more user interface devices 226, a location system 228, and a map generator 230. Machine 108 can include other items 232 as well.

Preparation functionality 216 includes all of the functionality (such as mechanical, hydraulic, pneumatic, electrical, etc.) that is used by machine 108 to prepare the agricultural material for bale forming machine 110.

Sensors 218 can include a wide variety of different types of sensors. For instance, the sensors can include material sensors 234 configured to sense and provide information indicative of the agricultural material being prepared by machine 108. Material sensors 234 illustratively include a yield sensor, such as a windrow sensor, that senses an expected yield for the agricultural material. In one example, a windrow sensor obtains data indicative of a volume of the windrow being formed by machine 108. Sensors 218 can also include machine position sensors 236 configured to sense a position of machine 108. For example, machine position sensors 236 can sense a tilt, yaw, and/or role of machine 108. Other examples of sensors 218 include, but are not limited, weather sensors, quality sensors, fuel consumption sensors, etc.

Processor(s) 220 is, in one example, a computer processor with associated memory and timing circuitry (not separately shown). It is illustratively a functional part of machine 108 and is activated by various other items in machine 108 to facilitate their operation.

Communication system 222 illustratively allows machine 108 to communicate with other items in environment 200. For instance, communication system 222 can be a cellular communication system, a communication system that allows machine 108 to access a wide area network (such as the Internet), a local area network communication system, a near field communication system, and/or a wide variety of other wired and wireless communication systems. In one example, communication system 222 is used by machine 108 to communication data to machine 110, other machines, and/or to store data in data store 214.

User interface component 224 illustratively (either by itself or under control of other items in machine 108) generate user interfaces on or through user interface device(s) 226 for an operator of machine 108. User interface device 226 can be a display device that generates user interface displays, an audible device that generates audible user interfaces, a haptic device that generates haptic user interfaces, or a wide variety of other types of user interface devices.

Location system 228 illustratively senses a location of machine 108. By way of example, location system 228 can be a GPS system, a cellular triangulation system, a dead reckoning system, or a wide variety of other systems that allow machine 108 to identify a location where machine 108 is during the agricultural material preparation operation.

Data store 208 can be used to store any of the data sensed, generated, or otherwise obtained by machine 108. In one example, data store 208 can store maps generated by map generator 230. The maps can include, but are not limited to, yield or windrow maps, terrain slope maps, topographical maps, or any other type of map.

One example of operation of machine 108 is described in greater detail below with respect to FIG. 6. Briefly, however, machine 108 prepares the agricultural material for bale forming machine 110 and obtains data that is position-referenced and can be used by bale forming machine 110 during the bale forming operation. For example, machine 108 can generate position-referenced yield data 238, position-referenced slope data 240 and/or a topographical map(s) 242. This data can be made available to various machines and systems in environment 200 in a variety of different ways. For instance, yield data 238, slope data 240, and/or map(s) 242 can be stored in data store 208 and/or data store 210. Alternatively, or in addition, they can be stored in data store 214, which is remote from and accessible by machines 108 and 110, as shown in FIG. 3.

The machines and systems can access the remote data store 214 using any of a wide variety of different networks, represented in FIG. 3. Network 212, for instance, can be one or more of a cellular network, a wide area network such as the Internet, a local area network, or other networks. In addition, the machines and systems can access the data by having the data transmitted directly from one machine or system to another, and having them stored locally on the data stores of each machine or system. Further, the data can be transmitted using store and forward techniques where a machine that has no access to the cellular or other network or the internet stores the data records locally. Then, when it comes into range of a given communication network, it transmits the data to other machines or systems within the service area of that network. In another example, the data can be transmitted to remote data store 214 where it is later accessed by the other machines and systems. Further, the data can be made available to the various machines and systems by storing them first on machine 108 and then manually transmitting them. As an example, the data can be can be first stored on machine 108 and then manually transmitted to machine 110 using a removable storage device, such as a flash drive, a removable disk, or a variety of other removable storage mechanisms. The data can then be manually transmitted to machine 110 where it is locally stored in data store 210. All of these and other types of mechanisms and architectures for machine the data available to the various machines and systems in environment 200 are contemplated herein.

Bale forming machine 110 includes bale forming functionality 244, bale ejection functionality 246 and one or more agricultural or other sensors 248. Machine 110 can also include a bale accumulator 250, one or more processors 252, a communication system 254, a user interface component 256, one or more user interface devices 258, and a location system 260. Machine 110 can include other items 262 as well. Bale forming machine 110 operates using a set of baler settings 282, which can be stored in data store 210. Alternatively, or in addition, settings 282 can be stored in data store 214, as illustrated in FIG. 3.

Bale forming functionality 244 illustratively includes all of the functionality (such as mechanical, hydraulic, pneumatic, electrical, etc.) that is used by machine 110 in order to form a bale of agricultural material. For example, bale forming functionality 244 is configured to pick up agriculture material in a windrow and convey that material to a compression chamber or other type of bale forming functionality. Once the bale is complete, bale ejection functionality 246 is configured to deposit the bale onto field 106 or into bale accumulator 250, if present.

Sensors 248 can include a wide variety of different types of sensors. In the illustrated example, sensors 248 includes material sensors 264 and machine position sensors 266. In one example, sensors 264 and 266 are similar to sensors 234 and 236, discussed above.

Processor(s) 252 is, in one example, a computer processor with associated memory and timing circuitry (not separately shown). It is illustratively a functional part of machine 110 and is activated by various other items in machine 110 to facilitate their operation.

Communication system 254 illustratively allows machine 110 to communicate with other items in environment 200. For instance, communication system 254 can be a cellular communication system, a communication system that allows machine 108 to access a wide area network (such as the Internet), a local area network communication system, a near field communication system, and/or a wide variety of other wired and wireless communication systems. In one example, communication system 254 is used by machine 110 to communication data to machine 108, other machines, and/or to store data in data store 214.

User interface component 256 illustratively (either by itself or under control of other items in machine 110) generate user interfaces on or through user interface device(s) 258 for an operator of machine 110. User interface device 258 can be a display device that generates user interface displays, an audible device that generates audible user interfaces, a haptic device that generates haptic user interfaces, or a wide variety of other types of user interface devices.

Location system 260 illustratively senses a location of machine 110. By way of example, location system 260 can be a GPS system, a cellular triangulation system, a dead reckoning system, or a wide variety of other systems that allow machine 110 to identify a location where machine 110 is during the agricultural material preparation operation.

As shown in FIG. 3, machine 110 also includes a control system 268 for controlling operation of machine 110. Control system 268 includes a maximum (or target) feed rate determination component 270, a target baler speed calculation component 272, a target baler pick up height calculation component 274, a bale position calculation component 276, a machine navigation path calculation component 278, and a machine control component 280. Operation of control system 268 and other items of machine 110 is described in greater detail below with respect to FIG. 7. Briefly, however, in one example control system 268 determines a maximum or target feed rate for material into machine 110 and, using yield data or other information indicative of a volume of the material in a path of machine 110, calculates the baler speed and/or pick up height to control the actual feed rate within the target feed rate. Then, once a bale is formed and ready to be released onto the terrain, control system 268 calculates a position for releasing the bale based on slope data, such as a terrain slope map or topographical map. Control system 268 can also calculate a navigation path for navigating machine 110 to the calculated bale release position.

Figure 4:
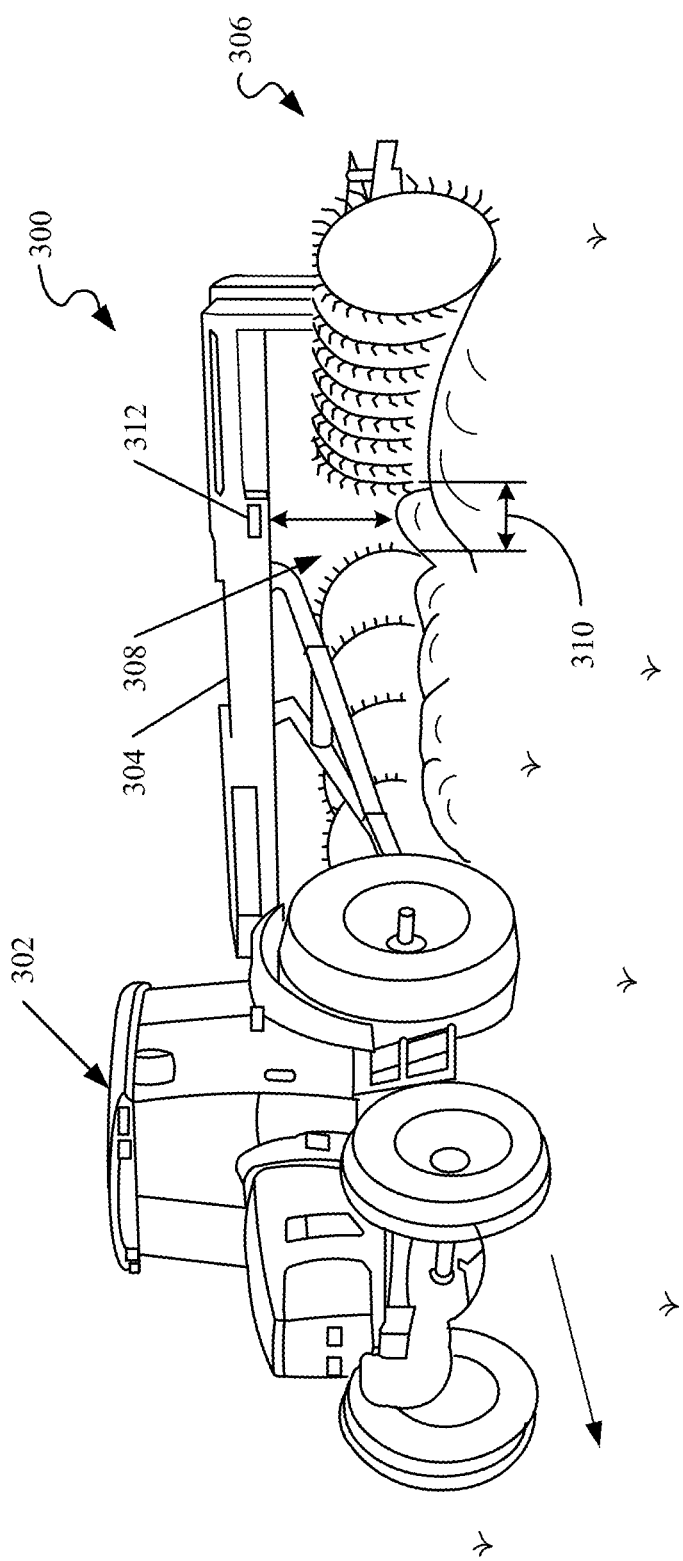
FIG. 4 illustrates one example of an agricultural material raking machine.

FIG. 4 illustrates one example of an agricultural material raking machine 300 that includes one or more sensors for detecting windrow yield or volume. Before discussing raking machine 300 in greater detail, a brief overview of windrow sensing will be discussed.

One type of windrow sensing system attempts to predict yield using a LIDAR sensor, or other sensor, when the material is cut or mowed. That is, this sensing arrangement senses material that is spread out across the ground in a wide, relatively thin swath layer. The sensor must therefore have a large angular range and fine angular resolution, that results in a large set of discrete measurements or data points along the width of the mower. This large quantity of data points is then processed to estimate a cross-sectional area between consecutive data points, for example by inputting the data into a complex formula. Of course, this process is complex and requires significant processing and storage bandwidth. Additionally, it may still require assumptions and be error-prone.

In accordance with one example, a sensing configuration is employed that utilizes the structure of and raking operation performed by raking machine 300 to obtain an indication of the windrow volume. Machine 300 includes a towing implement 302 and a raking implement 304 that is towed behind towing implement 302. Raking implement 304 is illustratively a wheel rake having a set of rake wheels 306. Rake wheels 306 are positioned to form a raking channel or gap 308. Raking channel 308 has a known width, as it is defined by a spacing width 310 between wheels 306. Within this raking channel 308, the windrow (e.g., windrow 112 in FIG. 1) is formed by restricting the material width through the raking channel 308. That is, the material is mechanically forced into the narrow width of raking channel 308. After implement 304 passes, the material falls, to some extent, into the actual windrow profile that will be fed into the baling machine. In other words, the final width of the windrow that is collected during the baling operation is larger than the width of the material within channel 308.

In the example of FIG. 4, raking implement 304 includes a windrow sensor 312 configured to obtain data indicative of a volume of the windrow being formed by machine 300. In the illustrated example, sensor 312 is positioned above raking channel 308 and configured to sense a height of the agricultural material within raking channel 308. Since the width of raking channel 308 is known (i.e., it is fixed during the raking operation), a relatively accurate indication of the windrow volume can be obtained with only a few data points. For instance, in the example of FIG. 4 sensor 312 obtains a single data point value indicative of a height of the windrow in a middle of channel 308. In combination with the known width of raking channel 308, this single data point is used to obtain the indication of the windrow volume. Of course, in other examples, more than one data point can be obtained by sensor 312, or by using one or more additional sensors on machine 300.

In one example, sensor 312 can comprise an electrical sensor using an ultrasonic or light sensor, or other type of sensor, to measure the height of windrow between the rake wheels 306. In another example, a windrow sensor can comprise a mechanical sensor that mechanically engages the top of the windrow to provide an indication of the windrow height. For instance, the mechanical sensor can comprise an arm that is pivotably attached to raking implement 304 and supports a wheel, paddle, or other feature that engages and follows a top of the windrow. By sensing a location of the device, an indication of the height, and thus the volume, of the windrow can be obtained.

In one example, sensor 312 outputs a value indicative of units in a particular measurement standard (e.g., inches, centimeters, etc.). In another example, the signal can be normalized to provide a relative height determination (e.g., on a scale of 0-10, with 0 representing a lowest windrow height and 10 representing a highest windrow height).

Machine 300 also includes a location system (not shown in FIG. 4) that can be mounted on one or more of the towing implement 302 or the raking implement 304.

Advantageously, compared to other sensing configuration such as the example LIDAR system discussed above, the sensing system of FIG. 4 has a reduce processing load and storage requirements. Further, in some scenarios, a more accurate windrow indication can be obtained without requiring an expensive, complex sensor and data processing system.

Figure 5:
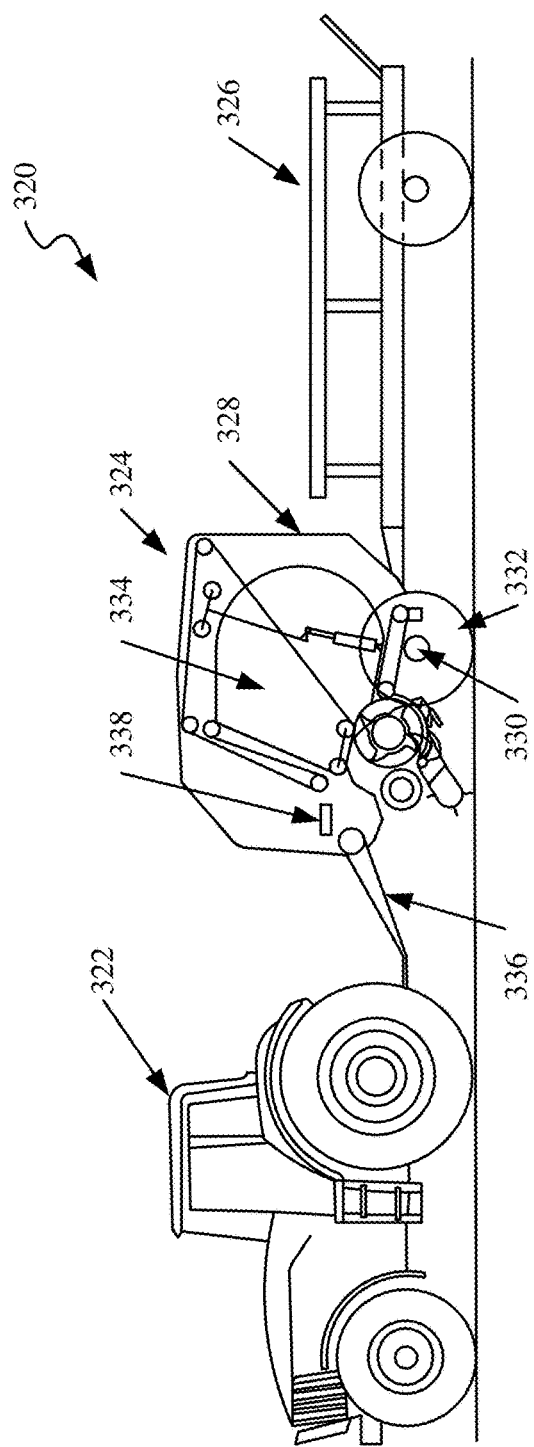
FIG. 5 illustrates one example of a bale forming machine.

FIG. 5 illustrates one example of a bale forming machine 320. Machine 320 illustratively includes a towing implement 322 and a towed implement in the form of a baler 324. Machine 320 can also include a bale accumulator 326.

Machine 320 includes a frame 328 on a chassis 330, that is supported on the ground by wheels 332. Wheels 332 follow a slope of the ground that extends transverse to the direction of operation. Baler 324 includes bale ejection functionality that is configured to release a bale within a bale forming chamber 334 onto accumulator 326 (or onto the ground if accumulator 326 is not utilized). In one example, the bale ejection functionality is configured to operate a gate into a raised position to release the bale from chamber 334.

Baler 324 is attached to towing implement 322 by a tow bar 336. Baler 324 includes a machine position sensor 338 configured to sense a relative position of baler 324. For example, sensor 338 can be configured to sense a pitch, roll, and/or yawn of baler 324. Baler 324 also includes a location system mounted thereon. Alternatively, or in addition, towing implement 322 can include the location system and/or machine position sensor 338.

Figure 6:
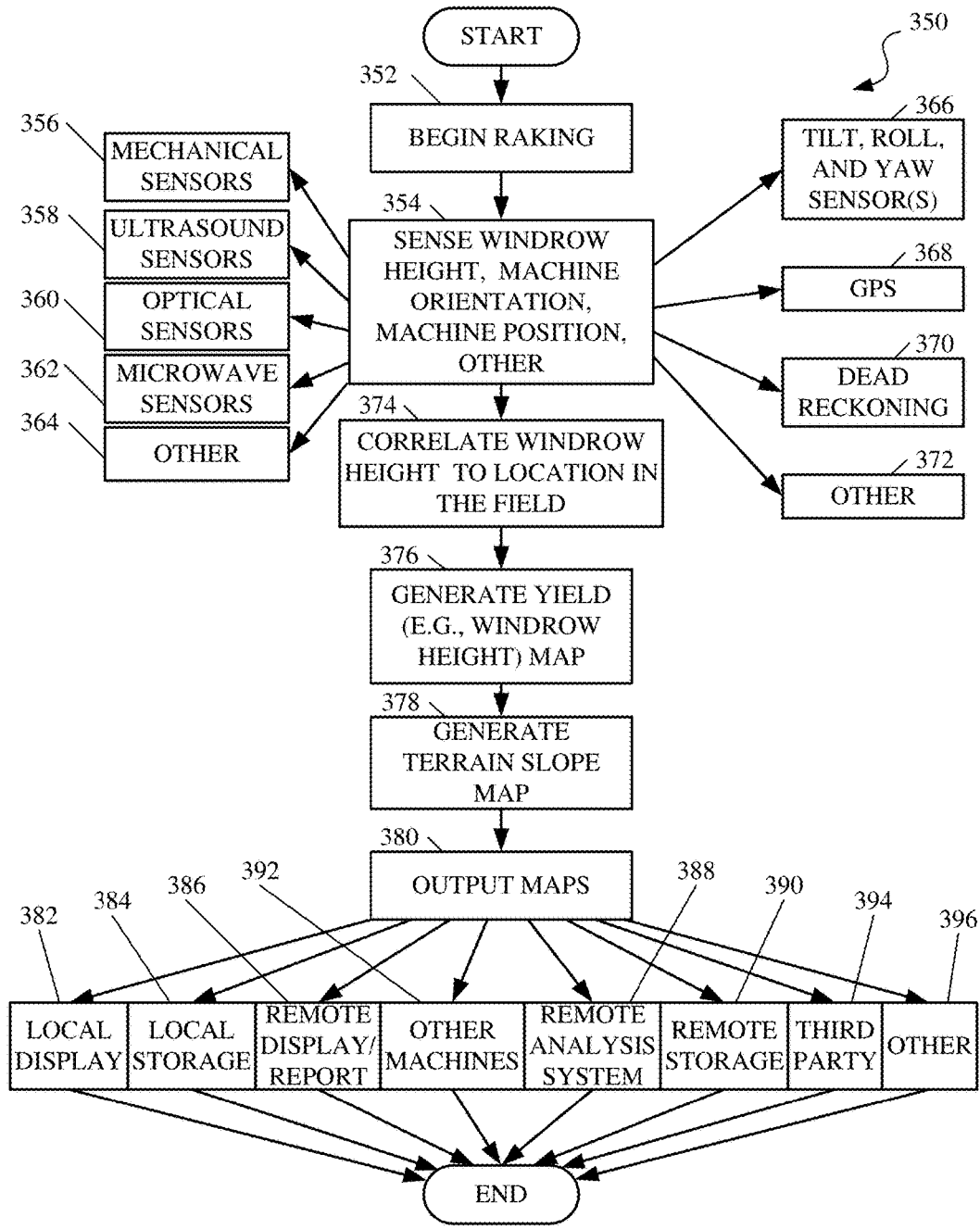
FIG. 6 is a flow diagram of one example of a method for operating an agricultural material preparation machine.

FIG. 6 is a flow diagram of one example of a method 350 for operating an agricultural material preparation machine. For sake of illustration, but not by limitation, method 350 will be described in the context of operating machine 108 to perform a raking operation.

At block 352, the raking operation is begun. During the raking operation, sensors on machine 108 sense windrow height, machine orientation, and/or machine position. Other characteristics of the operation can be sensed as well. This is represented at block 354.

In one example, the windrow height can be sensed using mechanical sensors 356, ultrasound sensors 358, optical sensors 360, microwave sensors 362, and/or other sensors 364. The machine orientation can be sensed using one or more of tilt, roll, and yaw sensors 366. Other sensors for detecting machine orientation can be used as well. The machine position can be sensed using a GPS receiver 368, a dead reckoning system 370, or other devices 372 as well.

Using the sensed data from block 354, the windrow height is correlated to the location in the field from which the windrow height was sensed, at block 374. This windrow height gives an estimation of the material volume per windrow length unit at a particular location within the field.

At block 376, a yield map can be generated based on the correlated information from block 374. For example, the yield map can indicate a series of windrow heights along the windrows in the field.

At block 378, a terrain slope map can be generated by correlating the machine orientation sensed at block 354 with the corresponding machine position. The terrain slope map provides an indication of the slope of the terrain at a plurality of positions in the field. The slope information can include, but is not limited to, an inclination angle as well as a direction of the slope.

At block 380, the maps are output to a wide variety of different places, and can be used in a wide variety of different ways. For example, the maps can be output for local display at block 382 or for local storage at block 384. Further, the maps can be output for remote display at block 386, remote analysis at block 388, and/or remote storage at block 390. The maps can be output to other machines at 392. For example, the maps can be output to bale forming machine 110 to utilize the yield maps and terrain slope map during the baling operation. The maps can also be output to third parties at block 394. The maps can be output to other places as well. This is represented by block 396.

Figure 7A:
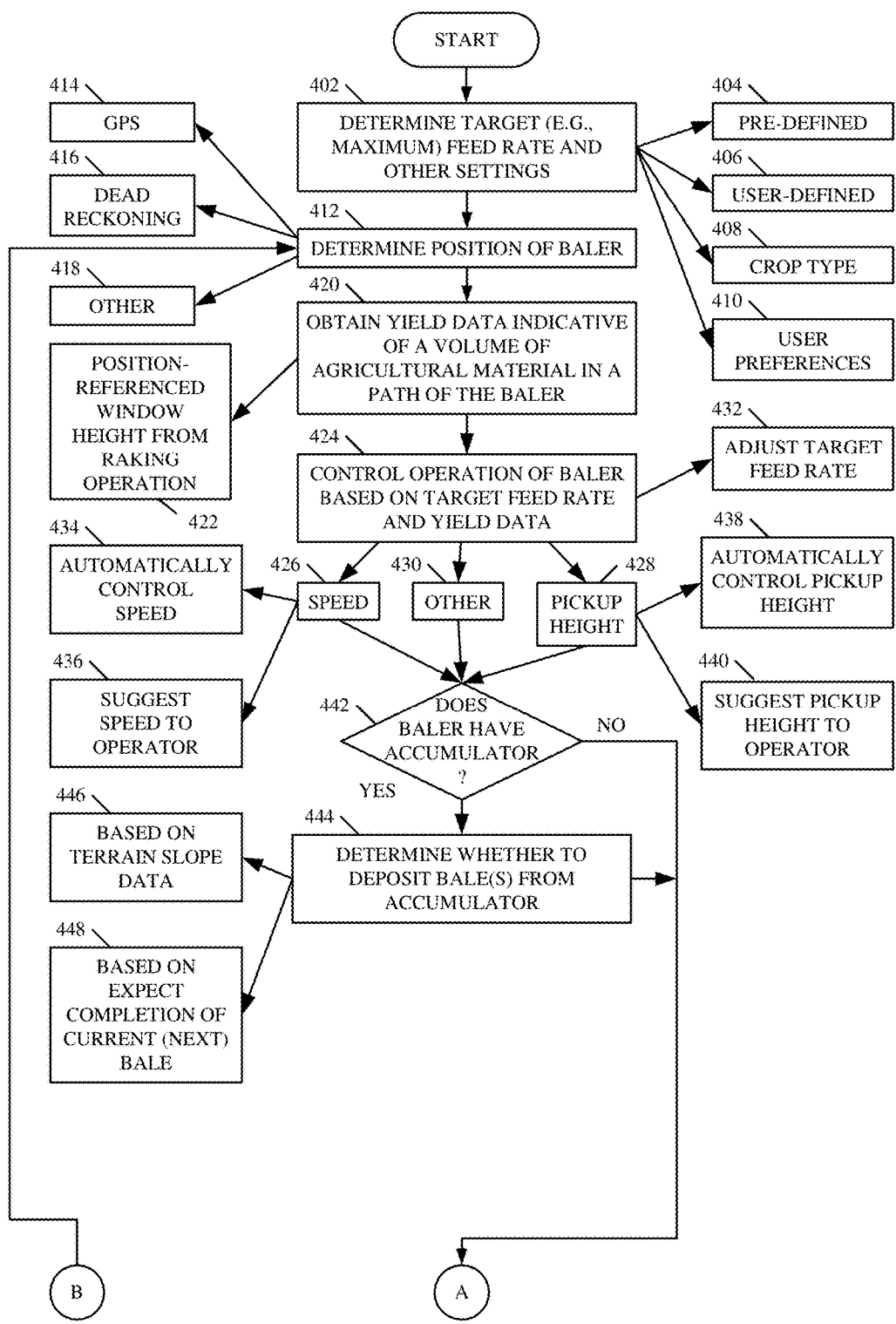
FIGS. 7A and 7B are a flow diagram of one example of a method for operating a bale forming machine.
Figure 7B:
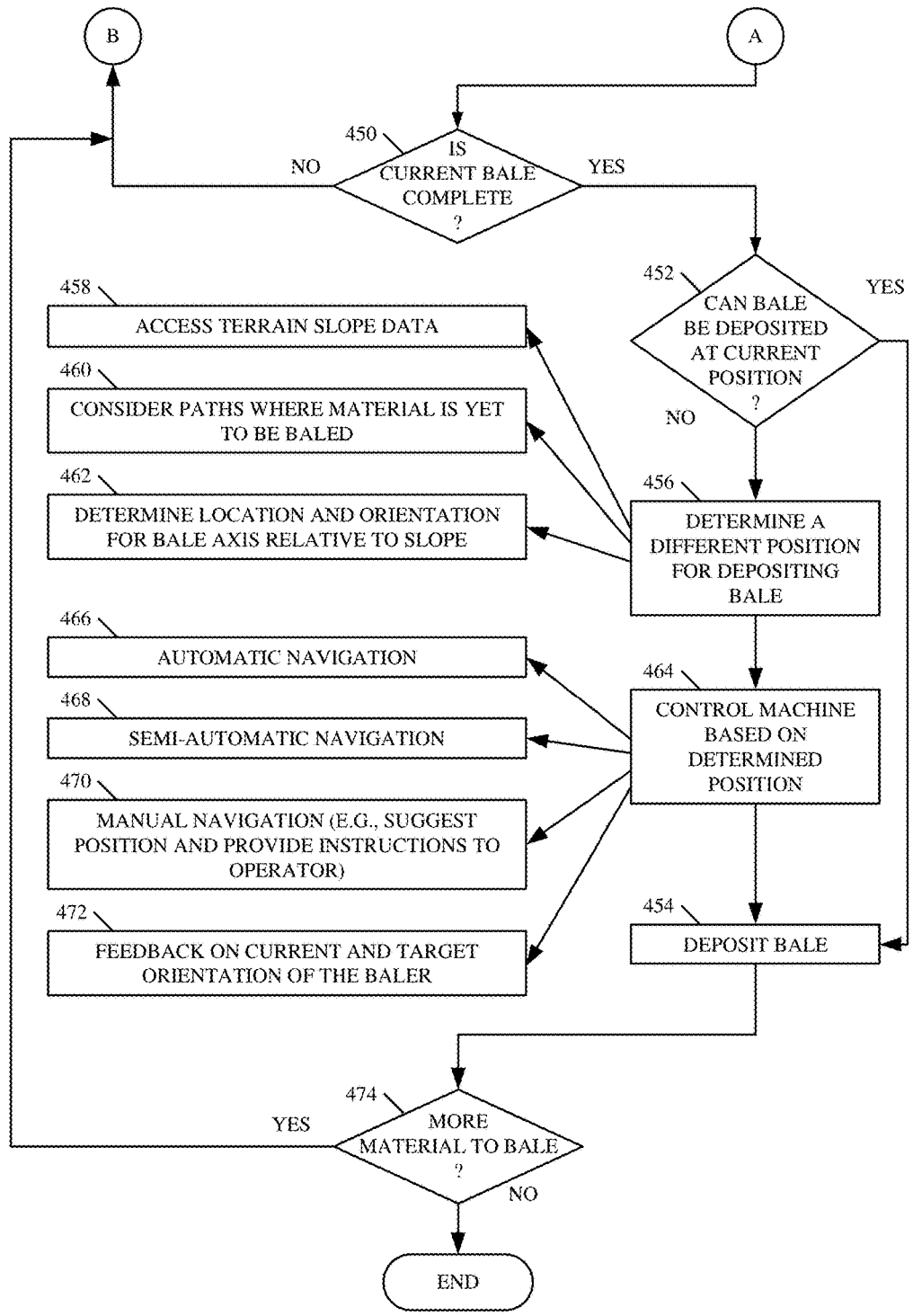

FIGS. 7A and 7B (collectively referred to as FIG. 7) are a flow diagram of one example of a method 400 for operating a bale forming machine. For sake of illustration, but not by limitation, method 400 will be described in the context of bale forming machine 110 illustrated in FIG. 3.

At block 402, a target feed rate is determined. In one example, the target feed rate can be a maximum feed rate set for the baling equipment and can be pre-defined (block 404) or user-defined (block 406), and/or can be calculated based on settings 282. For instance, the target feed rate can be set based on a crop type setting (block 408) and/or user preference settings (block 410).

At block 412, the position of the baler is determined using, for example, GPS (block 414), a dead reckoning system (block 416), or other system (block 418).

At block 420, yield data is obtained that is indicative of a volume of agricultural material in a path of the baler. This data can be stored locally (e.g., data store 210) and/or accessed from a remote data store (e.g., data stores 208 and/or 214). In one example, the yield data comprises a position-referenced windrow height obtained from a raking operation. This is represented by block 422.

At block 424, operation of the baler is controlled based on the target feed rate and the yield data obtained at block 420. This can include control related to a speed of the baler (block 426), a pickup height of the baler (block 428), or other functionality (block 430). Before discussing this in further detail, it is noted that the target feed rate can be adjusted at block 432. For example, based on the yield data indicating the volume of agricultural material entering the baler and operational characteristics of the baler (e.g., a load on the bale forming equipment, whether the baler became plugged at a given feed rate, etc.) the target feed rate can be increased or decreased for subsequent operation of the baler.

Referring again to block 426, in one example the speed of the baler can be automatically controlled based on the target feed rate and the yield data. For example, if the yield data indicates that the expected yield in the windrow ahead of the baler increases to a point where the actual feed rate is likely to exceed the target feed rate, speed calculation component 272 can calculate a new speed for the baler which is used by a machine control component 280 to automatically control propulsion system 206.

Alternatively, or in addition, the target speed can be displayed to the operator as a suggested speed modification. For instance, a visual display on the towing implement can instruct the operator to increase or decrease the speed of the tractor, and/or display the particular target speed, to discourage plugging of the baler.

With respect to block 428, the pickup height of the baler can be adjusted in addition to, or instead of, the speed of the baler. For example, at block 438 the pickup height of the baler can be automatically controlled by control component 280. Alternatively, or in addition, at block 440 a suggested pickup height can be displayed to the operator upon which the operator can manually control the baler pickup height, if desired. As mentioned above, the pickup height of the baler defines the positioning of the baler input mechanisms relative to the ground, and thus the amount of material that is obtained from the windrow.

In one example, at block 442, the method determines whether the machine 110 includes an accumulator and how many bales are contained in the accumulator. If so, the method determines whether to deposit bales from the accumulator at block 444. This can include identifying terrain slope data in a path of the machine at block 446 and/or determining an expected completion of the current or next bale at block 448. Based on this information, the machine can be controlled to automatically deposit a bale from the accumulator and/or instruct the operator to do so. By way of example, block 444 can determine that the accumulator is currently full and that there is a relatively long stretch of field that has a significant slope. In this case, block 444 can suggest to the operator to deposit one or more of the bales from the accumulator before reaching the slope even though the current bale in the baler is not completely formed.

At block 450, the method determines whether the current bale in bale forming functionality 244 is complete. If not, the method returns to block 412. If so, the method proceeds to block 452 in which it is determined whether the completed bale can be deposited at the current location of the baler. In one example, this includes accessing data from sensors 266 to determine a current tilt, yaw, and/or roll of the baler that indicates the slope of the current terrain on which the baler resides. If this information indicates that the bale can be deposited with little or no risk of the bale rolling down a slope, the method proceeds to block 454 in which the bale is deposited on the ground. For instance, the slope of the current terrain and/or orientation of the bale axis is compared to a threshold.

At block 456, the method determines a different position, that is spaced apart from the current position, on which to deposit the bale. In one example, block 456 accesses terrain slope data for the terrain near the baler and selects an optimal or near optimal location for depositing the bale. For example, the selected position can comprise a location that has an inclination angle below a threshold and is the closest to the current position of the baler. In one example, block 456 considers the paths where the material is yet to be baled. This is represented by block 460. For example, using information obtained during the raking operation, block 456 can determine that the baler is yet to pass over a windrow that is located on one side of the baler. As such, block 456 selects a location on the field that has already been baled (i.e., so the bale is not dropped on unbaled material).

At block 462, the method determines both the location and the orientation for the bale access relative to the slope. In one example, block 462 computes a latitude and longitude for positioning the bale as well as the orientation of the bale axis. For instance, an acceptable position of the bale axis can be based on the incline angle of the slope. That is, for a given slope (i.e., 20 degrees), the bale can be positioned within a particular angular range (e.g., 15 degrees) of the slope direction. It is understood that as the inclination angle of the slope increases, the difference between the axis of the bale and the direction of the slope should decrease to discourage the bale from rolling.

In one example, block 462 utilizes the settings defined at block 402 (e.g., settings 282). That is, block 462 can utilize a slope threshold that is based on one or more of the crop type and user preferences. For example, a bale formed of one crop type (e.g., corn stalks) may be less likely to roll down a hill than a bale formed of a different crop type (e.g., hay). As such, if the baler is baling corn stalks as opposed to hay, the slope threshold can be increased. Similarly, in one example a user preference setting can be indicative of how aggressive or conservative the user wants to be in selecting the location. For instance, if the field is located near people, livestock, equipment, or structures, the user may wish to be more conservative in bale placement as a bale rolling down the slope has a greater chance of damage or injury than a bale placed on a field that is not near any structures, livestock, equipment or people. In one example, these settings can be input through user interface component 256 and stored in settings 282.

At block 464, the machine is controlled based on the determined position. In one example, in addition to calculating the position for depositing the bale, component 278 can calculate a path for navigating the machine to that location. At block 466, control component 280 can automatically control drive mechanism 204 to navigate machine 110 to that location. In another example, semi-automatic navigation can be performed at block 468. For example, the steering mechanism can be automatically controlled but the propulsion system is controlled by the user.

In another example, at block 470, the user manually navigates machine 110 to the determined position with the aid of instructions provided by control system 268. For instance, instructions can be visually and/or audibly rendered to the user that advise the user which direction to turn the steering wheel and which direction to move the machine to reach the desired position. Alternatively, or in addition, at block 472 feedback on the current and target orientation of the baler can be provided to the operator. For instance, a visual display can show the current position of the baler along with the target position of the baler along with the target position of the baler to help the operator in moving machine 110.

In one example of block 464, as machine 110 is traversed across the field to the different location to deposit the bale, control system 268 determines the position and relative orientation of machine 110 using a combination of location system 260 and sensors 266. For instance, latitude and longitude coordinates from location system 260 can be used to determine a point on the terrain slope map, and tilt and roll data from sensors 266 can indicate which direction the baler is facing on the slope (e.g., is the bale axis perpendicular or parallel to the slope at the given latitude and longitude). Then, using this information, control system 268 can compute and output a further set of control instructions for navigating the baler to the desired location.

At block 474, if there is additional material to bale the method returns to block 412.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
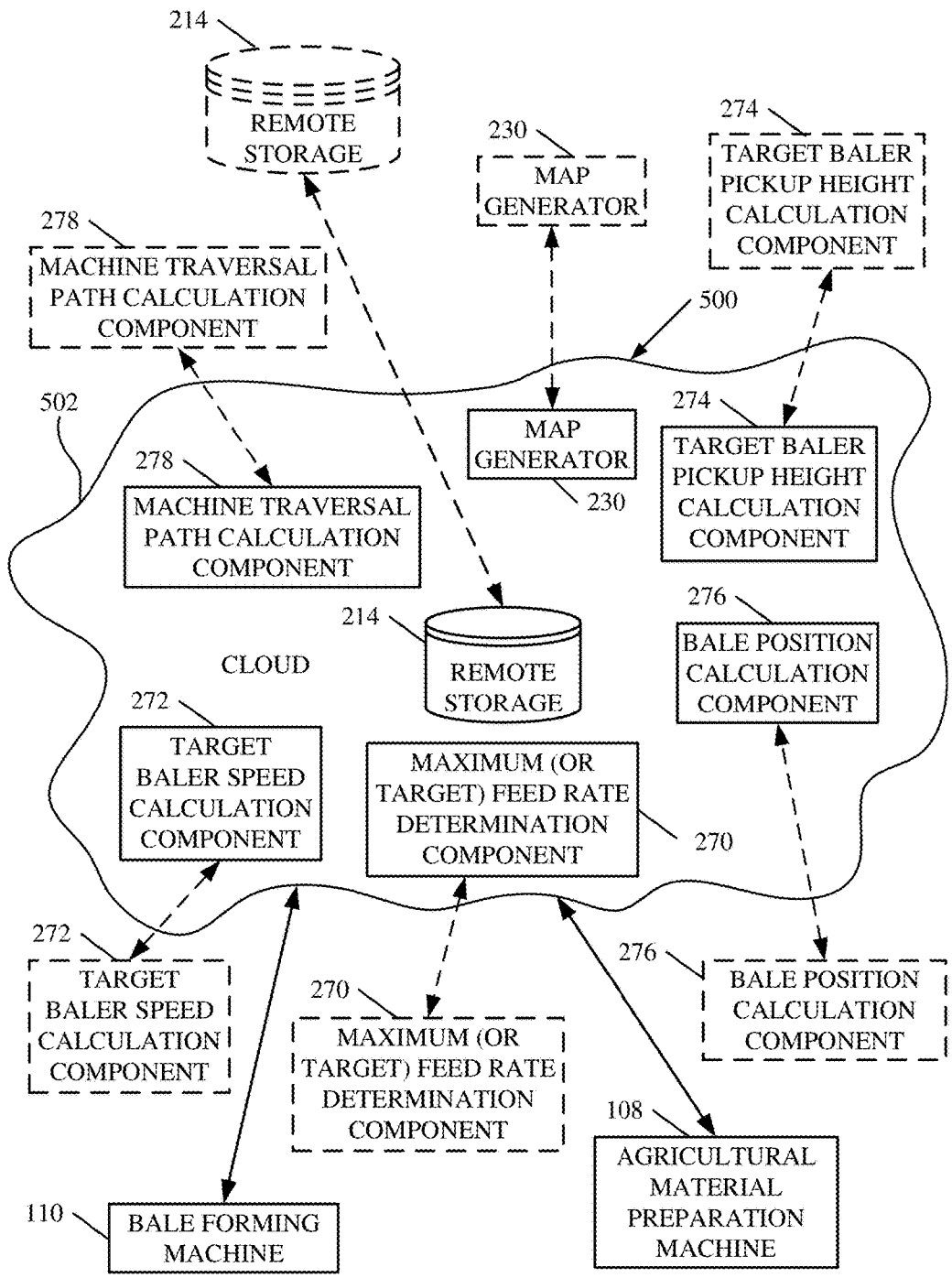
FIG. 8 is a block diagram showing one example of the environment illustrated in FIG. 3, in which components are deployed in a remote server architecture.

FIG. 8 is a block diagram of environment 200, shown in FIG. 3, except that it communicates with elements in a remote server architecture 500. In an example embodiment, remote server architecture 500 can provide computation, software, data access, and storage services that do not require end-user knowledge of the physical location or configuration of the system that delivers the services. In various embodiments, remote servers can deliver the services over a wide area network, such as the internet, using appropriate protocols. For instance, remote servers can deliver applications over a wide area network and they can be accessed through a web browser or any other computing component. Software or components shown in FIG. 3 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the embodiment shown in FIG. 8, some items are similar to those shown in FIG. 3 and they are similarly numbered. FIG. 8 specifically shows that one or more items in environment 200 can be located at a remote server location 502. For example, map generator 230, data store (e.g., remote storage) 214, and/or one or more of components 270, 272, 274, 276, and 278 can be located at a remote server location 502. Therefore, machines 108 and/or 110 access those systems through remote server location 502.

FIG. 8 also depicts another embodiment of a remote server architecture. FIG. 8 shows that it is also contemplated that some elements of FIG. 3 are disposed at remote server location 502 while others are not. By way of example, data store 214, map generator 230, and/or one or more of components 270, 272, 274, 276, and 278 can be disposed at a location separate from location 502, and accessed through the remote server at location 502. Regardless of where they are located, they can be accessed directly by machines 108 and/or 110, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the raking machine or baler comes close to the fuel truck for fueling, the system automatically collects the information using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the raking machine or baler until it enters a covered location. The raking machine or baler, itself, can then send the information to the main network.

It will also be noted that the elements of FIG. 3, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
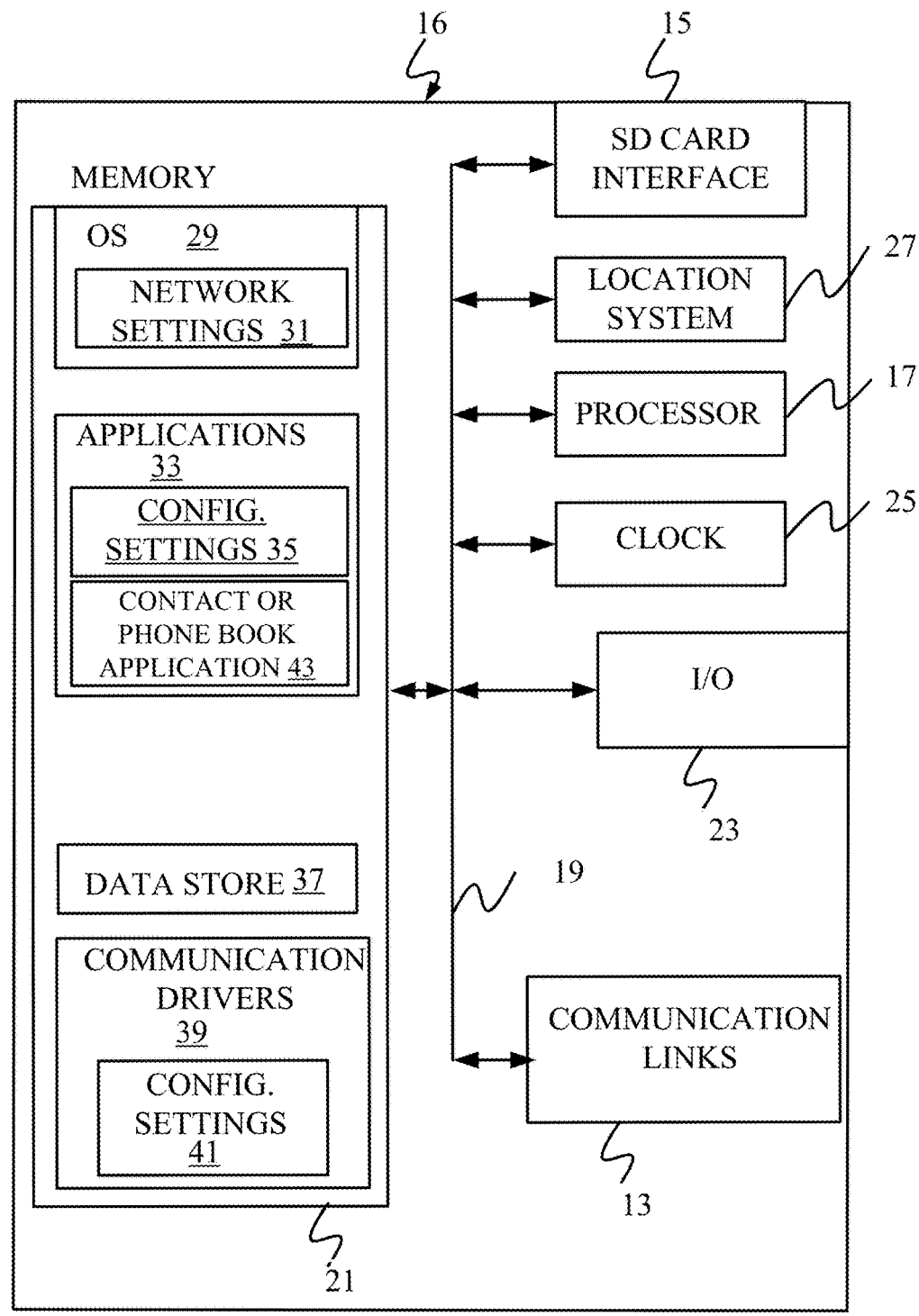
FIGS. 9-12 show examples of mobile devices that can be used in environments shown in previous figures.

FIG. 9 is a simplified block diagram of one illustrative embodiment of a handheld or mobile computing device that can be used as a user or client hand held device 16, in which the present system (or parts of it) can be deployed. For instance, a mobile device can be deployed in the operator compartment of machine 108 and/or 110 for use in generating, processing, or displaying the stool width and position data. FIGS. 10-13 are examples of handheld or mobile devices.

FIG. 9 provides a general block diagram of the components of a client device 16 that can run some components shown in FIG. 3, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

Under other embodiments, applications can be received on a removable Secure Digital (SD) card that is connected to an interface 15. Interface 15 and communications link 13 communicate with a processor 17 (which can also embody processors 220 and/or 252 from FIG. 3) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

Figure 10:
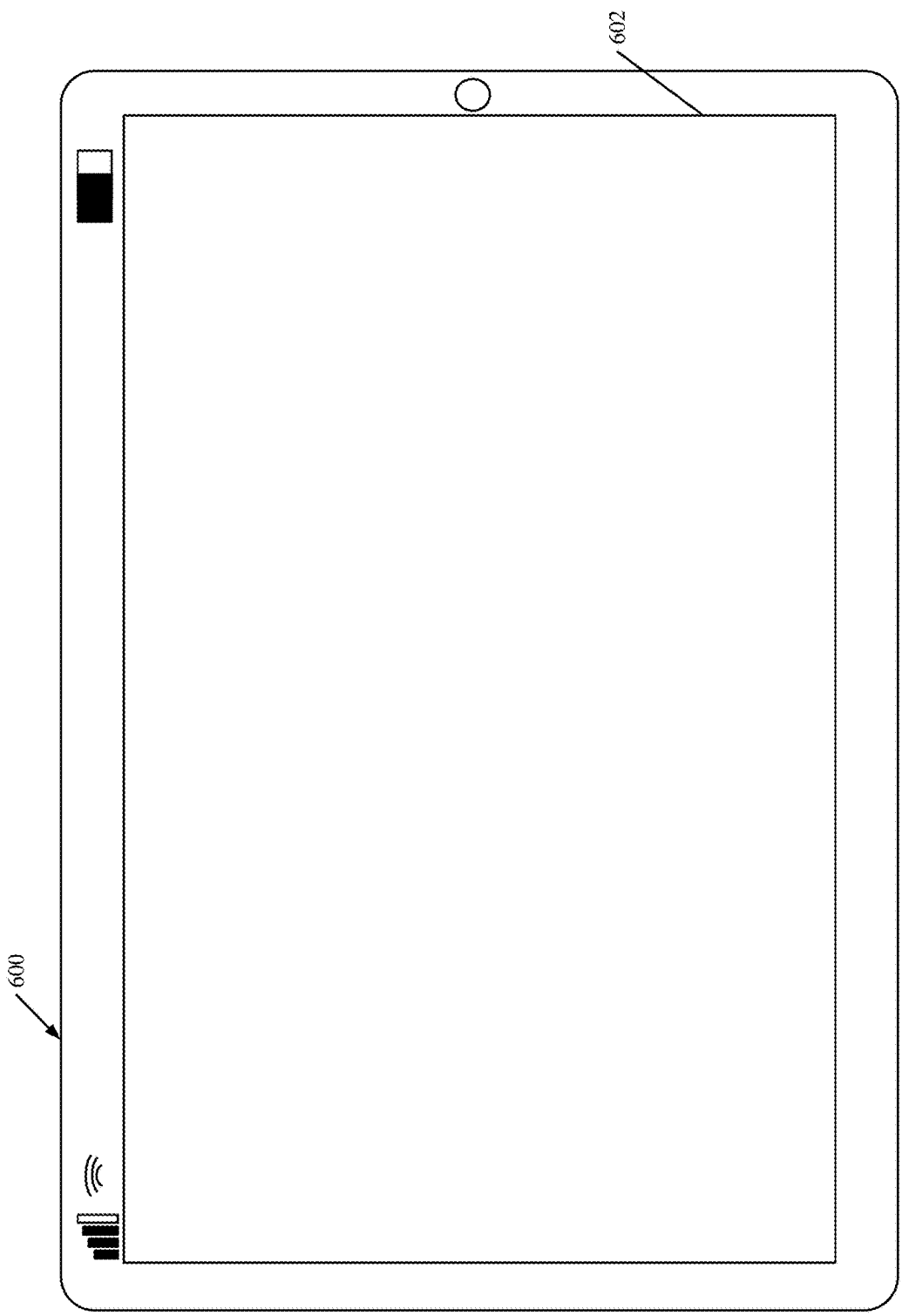

FIG. 10 shows one embodiment in which device 16 is a tablet computer 600. In FIG. 10, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

Figure 11:
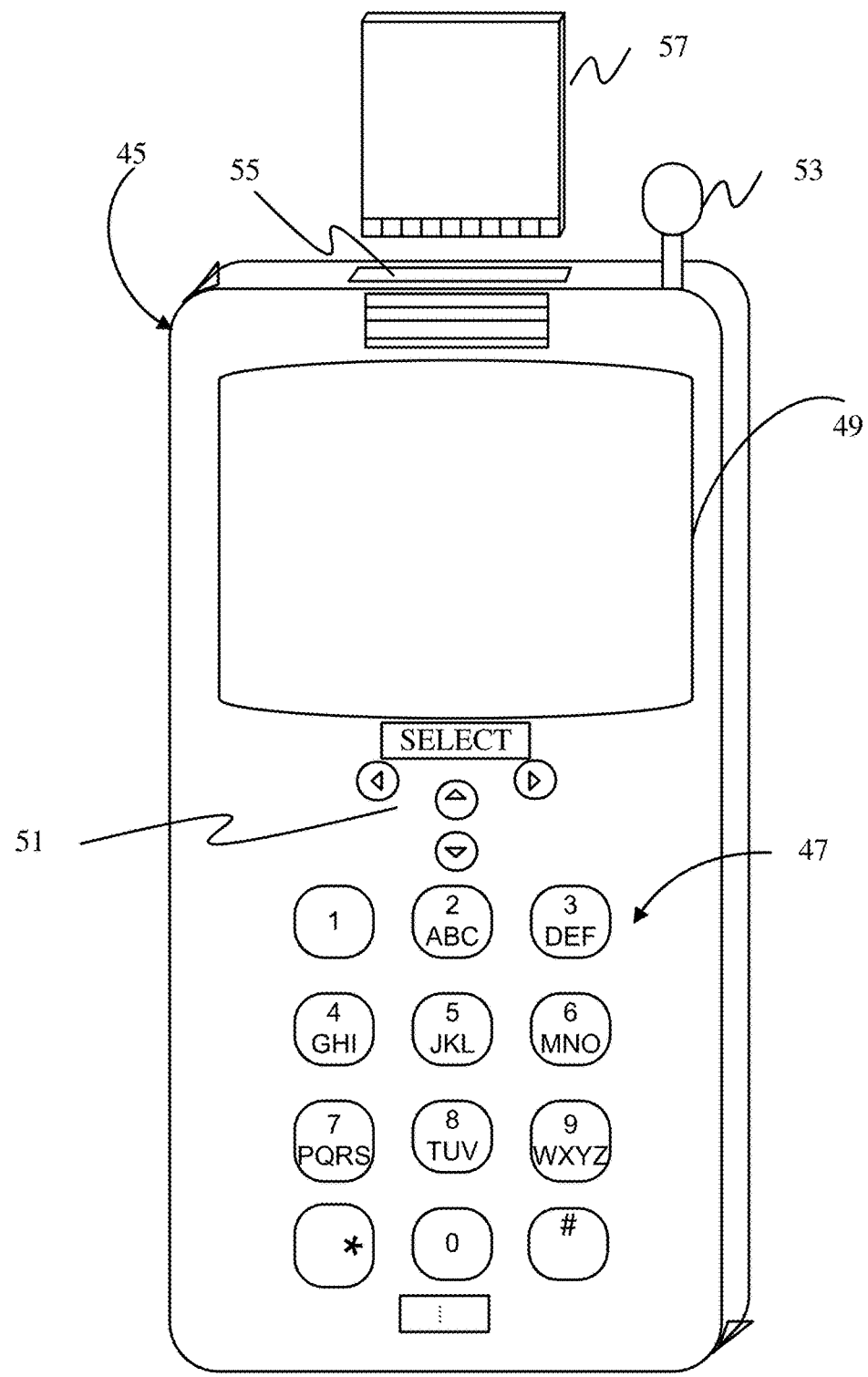

FIG. 11 provides an additional example of device 16 that can be used, although others can be used as well. In FIG. 11, a feature phone, smart phone or mobile phone 45 is provided as the device 16. Phone 45 includes a set of keypads 47 for dialing phone numbers, a display 49 capable of displaying images including application images, icons, web pages, photographs, and video, and control buttons 51 for selecting items shown on the display. The phone includes an antenna 53 for receiving cellular phone signals. In some embodiments, phone 45 also includes a Secure Digital (SD) card slot 55 that accepts a SD card 57.

Figure 12:
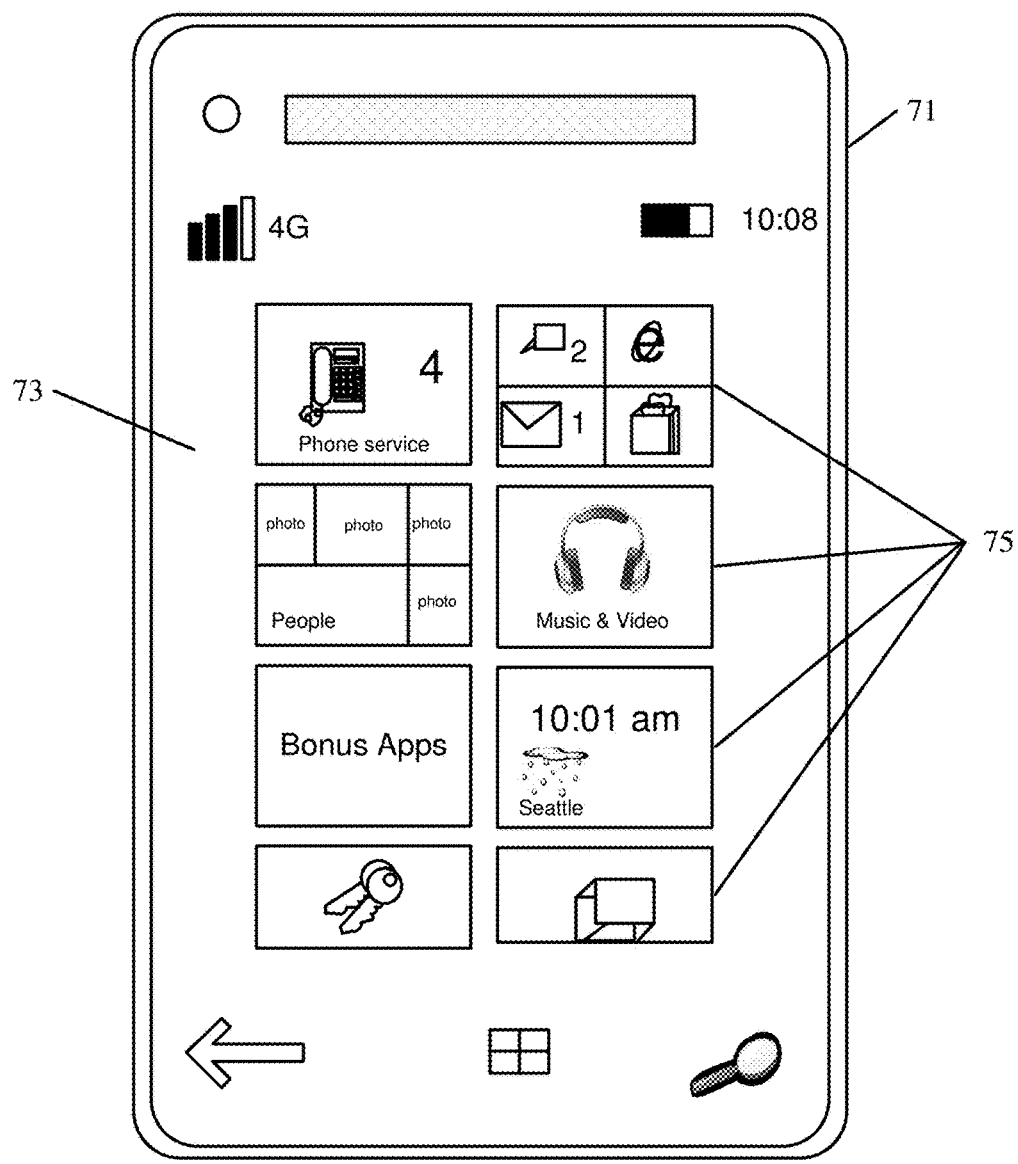

FIG. 12 is similar to FIG. 11 except that the phone is a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 13:
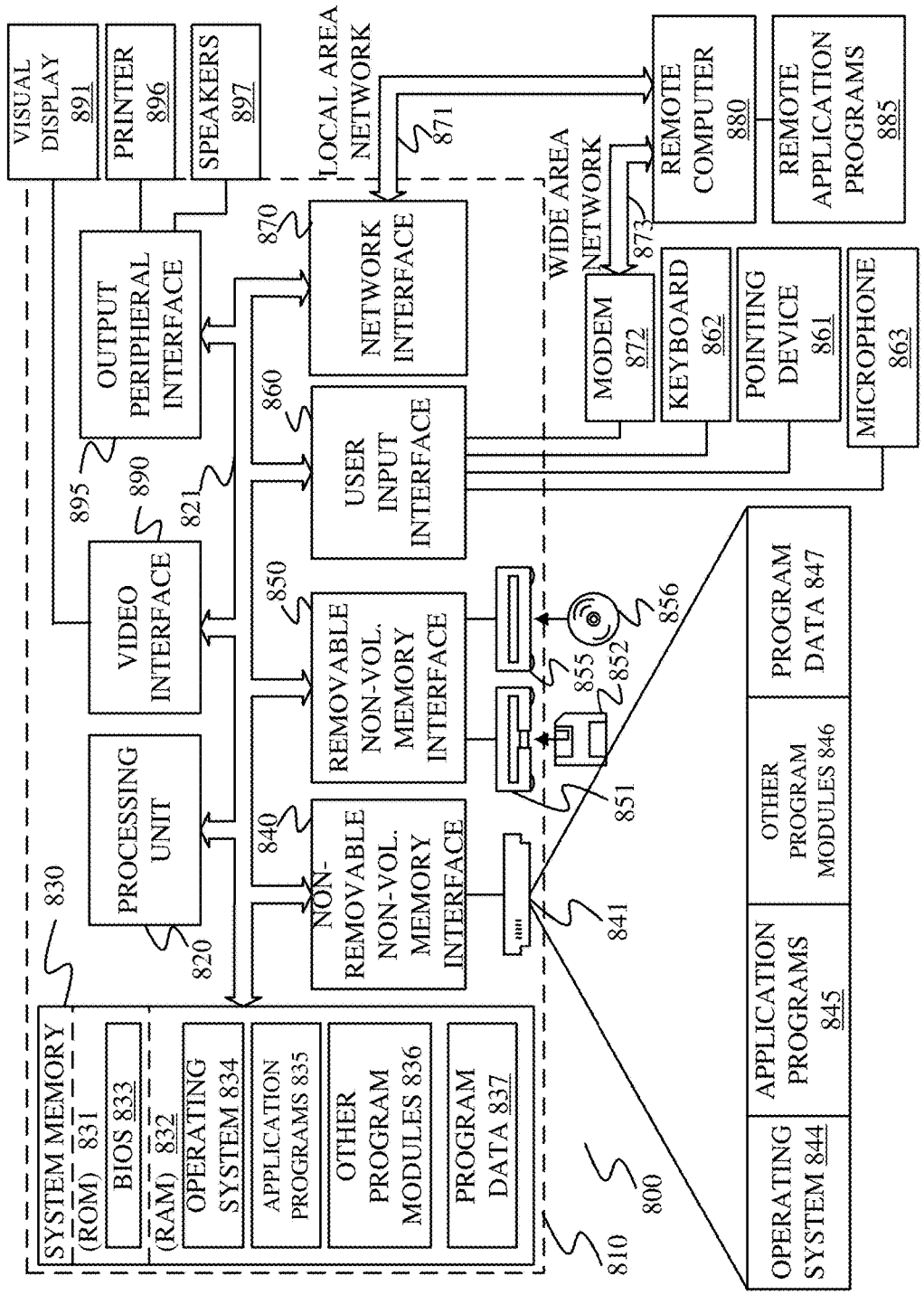
FIG. 13 is a block diagram of one example of a computing environment that can be deployed in any of the machines, systems, and/or architectures shown in previous figures.

FIG. 13 is one embodiment of a computing environment in which elements of FIG. 3, or parts of it, (for example) can be deployed. With reference to FIG. 13, an exemplary system for implementing some embodiments includes a general-purpose computing device in the form of a computer 810. Components of computer 810 may include, but are not limited to, a processing unit 820 (which can comprise processor 220 and/or 252), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 3 can be deployed in corresponding portions of FIG. 13.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 10 illustrates operating system 834, application programs 835, other program modules 836, and program data 837.

The computer 810 may also include other removable/non-removable volatile/nonvolatile computer storage media. By way of example only, FIG. 13 illustrates a hard disk drive 841 that reads from or writes to non-removable, nonvolatile magnetic media, a magnetic disk drive 851, nonvolatile magnetic disk 852, an optical disk drive 855, and nonvolatile optical disk 856. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (e.g., ASICs), Program-specific Standard Products (e.g., ASSPs), System-on-a-chip systems (SOCs), Complex Programmable Logic Devices (CPLDs), etc.

The drives and their associated computer storage media discussed above and illustrated in FIG. 13, provide storage of computer readable instructions, data structures, program modules and other data for the computer 810. In FIG. 13, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 13 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is an agricultural material baling system comprising a bale forming component configured to form a bale of agricultural material from a terrain, a control system configured to determine that the bale is to be released from the baling system onto the terrain, determine that a current location of the baling system has a slope above a threshold, determine a different location, that is spaced apart from the current location, for releasing the bale onto the terrain, and provide an output indicative of the different location.

Example 2 is the agricultural material baling system of any or all previous examples, wherein the agricultural material baling system comprises a towing implement and a towed baler implement that includes the bale forming component.

Example 3 is the agricultural material baling system of any or all previous examples, wherein the towing implement comprises a tractor and the bale forming component is configured to form substantially cylindrical bales.

Example 4 is the agricultural material baling system of any or all previous examples, wherein the threshold is adjustable based on one or more input parameters.

Example 5 is the agricultural material baling system of any or all previous examples, wherein the control system is configured to provide the output to a drive mechanism of the baling system to automatically control movement of the baling system across the terrain.

Example 6 is the agricultural material baling system of any or all previous examples wherein the control system is configured to provide the output to a user interface component, the user interface component being configured to render an indication of the different location to a user of the baling system.

Example 7 is the agricultural material baling system of any or all previous examples, wherein the user interface component is configured to render at least one of audible indications to the user that indicate suggested user drive inputs for navigating the baling system to the different location, or visual indications to the user that indicate suggested user drive inputs for navigating the baling system to the different location.

Example 8 is the agricultural material baling system of any or all previous examples, wherein the threshold is based on at least one of an inclination angle of the slope and a difference between a direction of the slope and an axis of the bale after it is ejected from the baling system onto the terrain.

Example 9 is the agricultural material baling system of any or all previous examples, wherein the control system is configured to obtain terrain slope information indicative of a slope of the terrain at a plurality of locations, and to determine the different position based on a slope of the different position, identified from the terrain slope information, relative to the threshold.

Example 10 is the agricultural material baling system of any or all previous examples, wherein the terrain slope information is obtained from a raking operation that rakes the agricultural material into windrows.

Example 11 is the agricultural material baling system of any or all previous examples, wherein the baling system comprises a bale accumulator, and the control system is configured to calculate the different position based on the terrain slope information and an expected completion time of a next bale in the bale forming component.

Example 12 is the agricultural material baling system of any or all previous examples, wherein the control system is configured to receive yield data indicative of a volume of agricultural material in a path of the baler and to control the baling system by at least one of rendering an indication to the operator indicative of a speed of the baling system or a pickup height of the bale forming component, and automatically adjusting a speed of the baling system or changing a pickup height of the bale forming component.

Example 13 is an agricultural material baling system comprising a bale forming component configured to form a bale of agricultural material, and a control system configured to obtain yield data from a raking operation that rakes the agricultural material into a windrow, the yield data being indicative of a volume of agricultural material in a path of the bale forming component, and control the baling system based on the yield data.

Example 14 is the agricultural material baling system of any or all previous examples, wherein the yield data comprises a position-referenced window map that indicates windrow volume at a plurality of locations.

Example 15 is the agricultural material baling system of any or all previous examples, wherein the control system is configured to control the baling system by at least one of: rendering an indication to the operator indicative of a suggested speed of the baling system, rendering a suggested pickup height of the bale forming component, automatically adjusting a speed of the baling system, or automatically adjusting a pickup height of the bale forming component.

Example 16 is an agricultural material raking machine comprising a raking mechanism configured to rake agricultural material on a terrain into at least one windrow, and a sensor configured to generate a signal indicative of a volume of the agricultural material in the windrow.

Example 17 is the agricultural material baling system of any or all previous examples, wherein the raking mechanism defines a raking channel and the sensor is configured to sense a height of the agricultural material within the raking channel.

Example 18 is the agricultural material baling system of any or all previous examples, wherein the raking mechanism comprises a set of rake wheels that are spaced to form the raking channel.

Example 19 is the agricultural material baling system of any or all previous examples, further comprising a location system configured to determine a location of the raking machine, wherein position-referenced yield data is generated based on the indicative of the volume of the agricultural material in the windrow and the location of the raking machine.

Example 20 is the agricultural material baling system of any or all previous examples, wherein a windrow map is generated based on position-referenced yield data obtained at a set of locations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural material baling system comprising:
    a bale forming component configured to form a bale of agricultural material from a terrain; and
    a control system configured to:
        determine that the bale is to be released from the baling system onto the terrain;
        determine that a current location of the baling system on the terrain has a slope above a threshold;
        access position-referenced terrain slope data that indicates a slope of the terrain at a plurality of locations along the terrain;
        based on the position-referenced terrain slope data and the threshold, determine a different location, that is spaced apart from the current location, for releasing the bale onto the terrain; and
        provide an output indicative of the different location.

2. The agricultural material baling system of claim 1, wherein the control system is configured to determine a route for the baling system from the current location to the different location, and wherein the output is indicative of the determined route.

3. The agricultural material baling system of claim 1, wherein the agricultural material baling system comprises a towing implement and a towed baler implement that includes the bale forming component configured to form substantially cylindrical bales.

4. The agricultural material baling system of claim 2, wherein the control system is configured to provide the output to a drive mechanism of the baling system to automatically control the baling system to traverse the route to the different location.

5. The agricultural material baling system of claim 2, wherein the control system is configured to provide the output to a user interface component, the user interface component being configured to render an indication of the route to a user of the baling system.

6. The agricultural material baling system of claim 5, wherein the user interface component is configured to render at least one of:
    audible indications to the user that indicate suggested user drive inputs for navigating the baling system along the route to the different location; or
    visual indications to the user that indicate suggested user drive inputs for navigating the baling system along the route to the different location.

7. The agricultural material baling system of claim 1, wherein the threshold is adjustable based on one or more input parameters.

8. The agricultural material baling system of claim 1, wherein the threshold is based on at least one of:
    an inclination angle of the slope of the terrain at the current location; or
    a difference between a direction of the slope of the terrain at the current location and an axis of the bale relative to the slope of the terrain at the current location after it is ejected from the baling system onto the terrain.

9. The agricultural material baling system of claim 1, wherein the terrain slope information comprises information obtained from a raking operation that rakes the agricultural material into windrows.

10. The agricultural material baling system of claim 1, wherein the control system is configured to receive yield data indicative of a volume of agricultural material in a path of the baler and to control the baling system by at least one of:
    rendering an indication to an operator indicative of a speed of the baling system or a pickup height of the bale forming component; and
    automatically adjusting a speed of the baling system or changing a pickup height of the bale forming component.

11. The agricultural material baling system of claim 1, wherein the control system is configured to determine the different location based on the position-referenced terrain slope information and an indication of locations on the terrain where the agricultural material has already been baled.

12. The agricultural material baling system of claim 1, wherein the control system is configured to select the different location from the plurality of locations based on proximity information that indicates a proximity of the baling system to the plurality of locations.

13. The agricultural material baling system of claim 1, wherein the control system is configured to determine a latitude and a longitude of the different location and an orientation of a baling axis of the baling system when the baling system releases the bale at the different location.

14. The agricultural material baling system of claim 1, wherein the control system is configured to determine that the current location of the baling system on the terrain has the slope above the threshold based on a combination of:
   an inclination angle of the slope at the current location; and
   a difference between a bale axis of the bale system and a direction of the slope at the current location.

15. An agricultural material baling system comprising:
   a bale forming component configured to form a bale of agricultural material from a terrain;
   a bale accumulator; and
   a control system configured to:
      obtain terrain slope information indicative of a slope of the terrain at a plurality of locations,
      determine that the bale is to be released from the baling system onto the terrain,
      determine that a current location of the baling system has a slope above a threshold
      calculate a different location, that is spaced apart from the current location, for releasing the bale onto the terrain, wherein the different location is determined based on:
         a slope of the different location, identified from the terrain slope information, relative to the threshold, and
         an expected completion time of a next bale in the bale forming component;
      provide an output indicative of the different location.

16. The agricultural material baling system of claim 15, wherein bale accumulator is configured to hold one or more bales released from the bale forming component, and the control system is configured to determine the different location based on a number of bales currently within the bale accumulator.

17. The agricultural material baling system of claim 16, wherein the control system is configured to:
   generate a bail release output signal indicative of release of a bale from the bale accumulator, wherein the bail release output signal is based on:
      the expected completion time; and
      the slope of the terrain along a path between the current location and a next location associated with completion of the next bale at the expected completion time.

18. A computer-implemented method of determining a bale releasing location, comprising:
   receiving an indication that a bale within a bale forming component of an agricultural baling system is ready to be released onto a terrain;
   determining that a current location of the baling system on the terrain has a slope above a threshold;
   accessing position-referenced terrain slope data that indicates a slope of the terrain at a plurality of locations along the terrain;
   based on the position-referenced terrain slope data and the threshold, determining a different location, that is spaced apart from the current location, for releasing the bale onto the terrain;
   determining a route for the baling system from the current location to the different location; and
   generating an output indicative of the determined route.

19. The method of claim 18, wherein determining the different location comprises:
   determining a coordinate location of the different location; and
   determining a desired bale orientation for releasing the bale at the coordinate location.

20. The method of claim 19, wherein generating the output indicative of the different location comprises:
   rendering visual indications on a user interface device indicative of suggested drive inputs for navigating the agricultural baling system to the coordinate position with the desired bale orientation.

* * * * *

UNITED STATES PATENT AND TRADEMARK OFFICE
CERTIFICATE OF CORRECTION

PATENT NO. : 9,930,834 B2
APPLICATION NO. : 15/151153
DATED : April 3, 2018
INVENTOR(S) : Nathan A. Chaney et al.

It is certified that error appears in the above-identified patent and that said Letters Patent is hereby corrected as shown below:

On the Title Page

Item (72) Column 1 Rodrigo H. Nomura:
Change Inventor's Country from Spain to Brazil Signed and Sealed this
Fifth Day of June, 2018

Andrei Iancu
*Director of the United States Patent and Trademark Office*